Reissued Dec. 3, 1940

Re. 21,651

UNITED STATES PATENT OFFICE 21,651

METHOD OF MAKING COKE

Earl W. Rice, St. Paul, Minn., and Walter J. Buchele, Iowa City, Iowa, assignors of sixty-six and two-thirds per cent to Courtney W. Kimler, Sr., and Harry Hall, Ames, Iowa No Drawing. Original No. 2,177,226, dated October 24, 1939, Serial No. 209,529, May 23, 1938. Application for reissue September 3, 1940, Serial No. 355,218

5 Claims. (Cl. 202—33)

The object of our invention is to afford a method of making coke which consists broadly in adding to petroleum carbon coke fines or breeze a proper amount of pitch derived from the by-products coke industry, having the characteristics hereinafter mentioned and charging the mixture into a vertical by-product coke oven and subjecting same to coking temperature until practically all volatile gases have been driven off and coking action is completed.

Our invention consists in the selection and mixing of the ingredients and treatment of the mixture as hereinafter more fully set forth.

Petroleum coke is a product of the oil distillation or cracking process as now practiced in the petroleum industry. A great percentage of petroleum coke is produced or recovered in the fine state or in what is called breeze form. These fines are difficult to market in their present state. They are smoky, greasy and dirty to handle. The fines are produced by the method of extraction from the stills; where chains, balls and other means are used to break up the accumulation of coke in the stills, as fast as possible to save time in clearing the stills and to make them quickly ready for the next run. What is wanted is gasoline, not coke. It readily resolves itself down to the point that the petroleum coke is a necessary evil of the oil cracking process and must be removed as quickly as possible regardless of the state or form of the resultant product. There is available a great quantity of this coke breeze for which there is no market.

The pitch used is a resultant of coal tar and by-product coking processes, and is used in a refined state. The melting point of the pitch must be such that the mixture will not effervesce excessively and form out the vents of the coke oven and thus clog up the vents when charged into ovens carrying a coking temperature.

The temperature at which the pitch will effervesce will vary. In that we mean a pitch of lower melting temperature can be used if the ovens are kept at 1800° F., than if oven temperature of 2200° is used. Lower melting point pitch can be used in a 14" oven and oven temperature of 1800° than would be necessary to use in a 14" oven with 2200° temperature. This means that a wide variation in melting range of pitch can be used and one must use the pitch best adapted to the temperature and width of oven. And the final qualification of the pitch used is that it will not effervesce and clog the vents of the oven when charged into coking oven at coking temperature or during the coking process.

A great many unsuccessful attempts have been made to utilize petroleum coke breeze and form it into hard solid pieces of a size adapted to metallurgical and domestic use. In fact we were discouraged by many coke producers who stated that they had spent hundreds of thousands of dollars trying to do what we claimed we could do.

At the plant where our tests were run, the results of which will appear later, we had to guarantee them against damage to ovens. Then they were so pessimistic and suspicious of our process, and our inability to push the finished product from the ovens that we had to start with ¼ charge of our materials and ¾ charge of by-product materials. Finally we used ½, then ¾ of our materials and less by-product in proportion, then a full charge of our material, and amperage on pusher was not raised.

We use a mixture of from 50% to 95% petroleum coke breeze to form 50% to 5% pitch in a fine state thoroughly mixed, and charge same into a vertical by-product coke oven and seal same against admission of air which is ordinary coking practice; subject the charge to a coking temperature until coking action is completed. Then vents are opened and charge pushed into the quenching car where it is quenched, which is also ordinary coking practice.

In our test a core pitch with a melting point of 284° F. was used. Core pitch can be secured with a melting range between 270° and 315° F. But any pitch that will not effervesce excessively and clog the oven can be used. Petroleum pitches commonly called asphalts have the same chemical composition as coal tar pitches and therefore may be used. They are available in proper quantities.

If a coke having some volatile gases is desired, the coking action can be stopped and charge pushed out before all gases are distilled off.

If a hard, dense metallurgical coke is desired, the action can be carried to completion and practically all volatile gases eliminated with a result approximately as follows: 99.19% fixed C.; .37% ash; .44% volatile (and .65% sulphur).

The length of coking time depends on oven temperature, width of oven, capacity of oven, etc.

In our tests a temperature of between 1700° and 1854° F. was used in a 17" oven on a coking time of approximately 32 hours, with excellent results.

If the oven is narrowed this coking time can be reduced, and if temperature is raised, the coking time will be reduced. If both the temperature is raised and the oven narrowed, the coking time can be materially decreased until it is possible to secure a coking cycle of between 4 to 8 hours.

We use a vertical by-product coke oven because in the horizontal type oven a thin layer is heated from below, and a great amount of sponge coke is formed on the exposed surface which results in a greater percentage of fines in the final product. With a vertical by-product coke oven the dust loss or fines are practically negligible.

Our process is a practical process and produces a high grade, hard coke, of good size and especially adapted to high grade metallurgical use. It can also be used domestically as our tests have proven.

This product is a high grade metallurgical coke, high in fixed carbon, low in volatile and ash, with a sulphur content adapted to metallurgical processes. The coke is a new product differing distinctly from petroleum coke or pitch, the original ingredients, in that it is higher in fixed carbon, lower in volatile and ash, and much harder and more firm in structure.

It has specific gravity of approximately 1.85.

It can be pushed through the oven without difficulty and comes out hard, solid, and of good size. Its hardness ranges from 80 to 300 by A. S. T. M. hardness test and will carry a very heavy burden, which makes it particularly valuable in the steel and metallurgical industry.

By this method we have taken two low priced, nearly waste products and produced a finished coke having a commercial value of about twice that of its ingredients with a loss of about 13%. Never heretofore has a high grade metallurgical coke been produced by merely putting together petroleum coke and pitch only and subjecting them to a coking temperature in a vertical by-product coke oven for the proper time.

This may be because it is known that with ordinary pitches, boiling or effervescing would set up so quickly as to make such a method practically impossible and unworkable. Among other things the gummy mass would not push through the ovens.

For the purpose of further illustration, the following table sets forth the results of a number of experimental runs which were made in accordance with the present invention. These experimental runs were made with core pitch (M. P. 284° F.).

TABLE No. 1

| Oven No. | Amount of charge | Pitch per 2,000 lbs. of carbon | Approx. aver. oven temp. (optical pyrometer) | Percent yield | Length reaction time | | Character of product |
|---|---|---|---|---|---|---|---|
| | | | | | Hrs. | Min. | |
| | *Pounds* | *Pounds* | °*F.* | | | | |
| 1 | 5,900 | 400 | 1810 | 87.8 | 32 | 24 | Excellent. |
| 2 | 11,600 | 500 | 1800 | 88.2 | 32 | 55 | De. |
| 3 | 25,600 | 400 | 1680 | 88.1 | 15 | 8 | Incompletely reacted. |
| 4 | 22,440 | 500 | 1720 | 88.2 | 32 | 48 | Good. |
| 5 | 24,980 | 500 | 1700 | 88.7 | 32 | 20 | Excellent. |
| 6 | 24,700 | 500 | 1744 | 89.1 | 32 | 34 | De. |
| 7 | 26,400 | 500 | 1780 | 88.6 | 32 | 24 | De. |
| 8 | 26,880 | 500 | 1854 | 88.3 | 32 | 28 | De. |

It should be noted that the present invention may be practiced utilizing temperatures ranging from 1600° to 3000° F. and the reaction may be carried out for a period of time ranging from 4 to 40 hours. The variation in temperature and reaction time depends upon the size of the retort used, the quantity of material and similar discretionary factors.

Samples of the coke made in accordance with the present invention have been subjected to laboratory tests for chemical composition and physical characteristics. Samples taken from one representative batch of this new synthetic fuel showed the following analysis:

TABLE No. 2

| Materials charged | $H_2O$ | Volatile matter | Fixed carbon | Ash | Sulphur |
|---|---|---|---|---|---|
| Granular petroleum carbon | 7.60 | 7.37 | 92.31 | .32 | .84 |
| Pitch | ------ | 51.58 | 48.23 | .19 | .47 |
| Mix | 6.70 | 15.11 | 84.58 | .31 | .70 |
| Resultant coke | ------ | .44 | 99.19 | .37 | .65 |

The physical characteristics of this product were tested by the Standard Tumbler Test method. This consists in placing the coke in a drum 5 feet in diameter and 30 inches long and making 50 revolutions of the drum. The case of the drum is perforated with 2½-inch openings. One hundred pounds of material is charged into the drum. The results were as follows:

TABLE No. 3

*Tumbler test*

| Charged | | 100 lbs. |
|---|---|---|
| Total in drum | A | 63.9 |
| Percent on 2" screen | B | 37.2 |
| Percent on 1½" screen | C | 26.7 |
| Through drum | D | 35.6 |
| Percent on 1" screen | E | 17.8 |
| Percent on ½" screen | F | 5.0 |
| Percent through ½" screen | G | 12.8 |
| Dust loss | H | 0.5 |

The standard A. S. T. M. formulas based on standard red brick for calculating the strength, hardness and brittleness gives the following results on this sample:

TABLE No. 4

$$\text{Strength}=\frac{100\times B\times C}{A\times E}+A+\frac{E^2}{100-A}=149.5$$

$$\text{Hardness}=(100-F)+\frac{(F-G+H)\times 100-A}{100}=88.4$$

$$\text{Brittleness}=(100-A)-F=31.1$$

Apparent gravity = 1.14

True gravity (65-mesh screen) = 1.85

The chemical analyses of the product of other runs was as follows:

TABLE No. 5

| Sample | $H_2O$ | Volatile matter | Fixed carbon | Ash | Sulphur |
|---|---|---|---|---|---|
| 1 | .... | 0.5 | 98.3 | 1.20 | 1.22 |
| 2 | .... | 1.0 | 97.8 | 1.20 | 1.24 |
| 3 | .... | 1.76 | 96.87 | 1.37 | 1.52 |
| 4 | .... | 1.84 | 97.16 | 1.00 | 1.41 |

It will be seen from the above data that the present invention makes possible the production of a new, solid fuel, unlike any existing fuels. This present fuel is hard, clean to handle, has not less than 97% of fixed carbon, has less than 2% of volatile matter and as low as .37% of ash.

In determining the absolute structural strength of this coke as distinguished from the A. S. T. M. comparative method, pieces were squared by cutting them with a hack-saw. They were faced with plaster of Paris before being placed in a compression testing machine. They were then tested in the same manner as concrete cubes. The following table is representative of the results obtained:

TABLE No. 6

*Absolute structural strength*

| Test No. | Cube size | | | Ultimate strength | |
|---|---|---|---|---|---|
| | Height | Dimensions | Gross area | Total | Lbs. per square in. |
| | *Inches* | *Inches* | *Sq. in.* | *Pounds* | |
| 1 | 2.25 | 1.81 x 1.67 | 3.03 | 3,340 | 1,102 |
| 2 | 1.80 | .975 x 1.265 | 1.23 | 1,820 | 1,480 |
| 3 | 2.16 | 1.48 x 1.56 | 2.31 | 2,210 | 957 |
| 4 | 1.75 | 2.15 x 1.49 | 3.2 | 3,190 | 997 |
| 5 | 1.85 | 1.50 x 1.64 | 2.46 | 2,790 | 1,134 |
| Average | | | | | 1,134 |

These ultimate strength values are quite comparable to the ultimate strength values desired for high grade metallurgical fuels made from coal. It has never been possible to manufacture a coke from these materials that carries the necessary sizing and has this structural strength value. In fact a fuel produced in accordance with the present invention has a structural strength which is more than double the structural strength of any previously prepared fuel of this general character.

This application is a continuation-in-part of applicants' application Serial No. 132,594, filed March 24, 1937.

It is to be understood that, although some particular compositions embodying the present invention and methods of producing the same and also some of the arts in which the present invention may be utilized have been set forth and discussed above, nevertheless the present invention is not limited to the exact ingredients or proportions or to the precise methods of those arts mentioned, the scope of said invention being commensurate with the following claims.

We claim:

1. A method of producing a metallurgical coke from petroleum coke consisting of the mixing of petroleum coke breeze or fines, with pitch derived from the by-product coke or coal tar industry in the proportion of from 50% to 95% by weight of petroleum coke breeze or fines and 50% to 5% by weight of pitch in fine state and charging same into a vertical by-product coke oven and subjecting to a coking temperature until coking action is completed, producing a metallurgical coke having approximately the following analysis: 99.19% F. C.; .37% ash, .44% volatile and .65% sulphur.

2. A method of producing a metallurgical coke from petroleum coke consisting of the mixing of petroleum coke breeze or fines with "core pitch" in the proportion of 50% to 95% petroleum coke breeze or fines with from 50% to 5% "core pitch" in fine state, charging same into a vertical by-product coke oven and subjecting same to a coking temperature until coking action is completed, producing a metallurgical coke having approximately the following analysis: 99.19% F. C.; .37% ash, .44% volatile and .65% sulphur.

3. A method of producing a metallurgical coke from petroleum coke consisting of mixing of petroleum coke breeze or fines with pitch derived from the distillation of coal tars and having a melting point such that it will not effervesce excessively and clog the oven vents, in the proportion of 50% to 95% petroleum coke breeze or fines with from 50% to 5% of said pitch in a fine state, charging said mixture into a vertical by-product coke oven and subjecting same to a coking temperature until coking action is completed, producing a metallurgical coke having approximately the following analysis: 99.19% F. C.; .37% ash, .44% volatile and .65% sulphur.

4. A method of producing a metallurgical coke from petroleum coke consisting of the mixing of petroleum coke breeze or fines, with pitch derived from the by-product coke or coal tar industry, in the proportion of from 50% to 95% by weight of petroleum coke breeze or fines and 50% to 5% by weight of pitch in fine state and charging same into a by-product coke oven and subjecting to a coking temperature until coking action is completed, producing a metallurgical coke having approximately the following analysis: 99.19% F. C.; .37% ash, .44% volatile and .65% sulphur.

5. A method of producing a metallurgical coke from petroleum coke consisting of the mixing of petroleum coke breeze or fines with pitch having a melting point such that it will not effervesce excessively and clog the oven vents, in the proportion of 50% to 95% petroleum coke breeze or fines with from 50% to 5% of said pitch in a fine state, charging said mixture into a coking oven and subjecting same to a coking temperature until coking action is completed, producing a metallurgical coke having approximately the following analysis: Not less than 97% F. C.; not more than 2% volatile matter; not less than .37% ash.

EARL W. RICE.
WALTER J. BUCHELE.